United States Patent
Stelzer et al.

(10) Patent No.: US 12,126,273 B2
(45) Date of Patent: Oct. 22, 2024

(54) METHOD FOR DRIVING AN ELECTRO-OPTICAL FUNCTIONAL LAYER BY MEANS OF A CONTROL UNIT AND ARRANGEMENT THEREFOR

(71) Applicant: SAINT-GOBAIN GLASS FRANCE, Courbevoie (FR)

(72) Inventors: Richard Stelzer, Düsseldorf (DE); Bastian Klauss, Kempen (DE); Michael Zeiss, Heinsberg-Haaren (DE); Doane Shelby Craig, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/040,076

(22) PCT Filed: Aug. 30, 2021

(86) PCT No.: PCT/EP2021/073860
§ 371 (c)(1),
(2) Date: Jan. 31, 2023

(87) PCT Pub. No.: WO2022/058145
PCT Pub. Date: Mar. 24, 2022

(65) Prior Publication Data
US 2023/0318481 A1    Oct. 5, 2023

(30) Foreign Application Priority Data
Sep. 15, 2020    (EP) .................................. 20196193

(51) Int. Cl.
*H02M 7/44* (2006.01)
*G02F 1/01* (2006.01)
(Continued)

(52) U.S. Cl.
CPC ............ *H02M 7/44* (2013.01); *G02F 1/0121* (2013.01); *G02F 1/137* (2013.01); *H02M 1/10* (2013.01)

(58) Field of Classification Search
CPC ............ H02J 7/00; H02J 7/0063; H02M 7/44; H02M 1/10; G02F 1/0121; G02F 1/137
See application file for complete search history.

(56) References Cited

U.S. PATENT DOCUMENTS

| | | | |
|---|---|---|---|
| 2010/0123435 A1 | 5/2010 | Piazza et al. | |
| 2010/0128232 A1 | 5/2010 | Kagata et al. | |

FOREIGN PATENT DOCUMENTS

| | | |
|---|---|---|
| CN | 2740453 Y | 11/2005 |
| DE | 42 05 099 C1 | 7/1993 |

(Continued)

OTHER PUBLICATIONS

International Search Report as issued in International Patent Application No. PCT/EP2021/073860, dated Nov. 18, 2021.

(Continued)

*Primary Examiner* — Carlos Amaya
(74) *Attorney, Agent, or Firm* — Pillsbury Winthrop Shaw Pittman LLP (57) ABSTRACT

A method for driving an electro-optical functional layer by a control, the functional layer being applied on a substrate and being variable in its transmissive and/or reflective properties by applying an electric field, the control unit having a supply voltage input and a feed output, and a voltage measuring system and an energy store, includes measuring a voltage actually available at the supply voltage input, if the available voltage is greater than a reference value, driving the functional layer with an AC voltage via the feed output, the energy store being charged at least in sections, if the available voltage is less than or equal to a reference value, driving the functional layer with a DC (Continued)

voltage via the feed output. At least part of the energy for the driving is drawn from the energy store. The DC voltage is less than the peak value of the AC voltage.

14 Claims, 4 Drawing Sheets

(51) Int. Cl.
  *G02F 1/137* (2006.01)
  *H02M 1/10* (2006.01)

(56) References Cited

FOREIGN PATENT DOCUMENTS

| | | |
|---|---|---|
| DE | 10 2010 056203 A1 | 2/2012 |
| JP | 2012-053308 A | 3/2012 |
| JP | 2015-071910 A | 4/2015 |
| JP | 2018-054868 A | 4/2018 |
| JP | 2018-177054 A | 11/2018 |
| KR | 10-2010-0056355 A | 5/2010 |
| KR | 10-2010-0061337 A | 6/2010 |
| KR | 10-2018-0088473 A | 8/2018 |
| WO | WO 2010/142019 A1 | 12/2010 |
| WO | WO 2020/152075 A1 | 7/2020 |

OTHER PUBLICATIONS

Notice of Preliminary Rejection as issued in Korean Patent Application No. 10-2023-7007144, dated Aug. 9, 2024.

PRIOR ART

METHOD FOR DRIVING AN ELECTRO-OPTICAL FUNCTIONAL LAYER BY MEANS OF A CONTROL UNIT AND ARRANGEMENT THEREFOR

CROSS-REFERENCE TO RELATED APPLICATIONS

This application is the U.S. National Stage of PCT/EP2021/073860, filed Aug. 30, 2021, which in turn claims priority to European patent application number 20196193.5 filed Sep. 15, 2020. The content of these applications are incorporated herein by reference in their entireties.

FIELD

The present invention is directed to a method and arrangement for driving a functional layer in a glazing.

BACKGROUND

From the prior art—and in particular from automotive engineering—is known to drive electro-optical functional layers by means of a control unit.

Generally, AC voltages are used for the driving since DC voltages can lead to faster aging of the electro-optical functional layer.

However, if there is a change in the amplitude voltage and/or the amplitude frequency, this can be perceived as a change in the optical properties.

This change in optical properties is, however, considered disturbing.

Such changes can have a variety of causes.

This will be illustrated using the example of a vehicle.

There, the low input DC voltage Vin of a battery, e.g., 12 V or 24 V, is usually converted by means of a regulator to a higher alternating voltage Vout, e.g., 60 V (or more). The alternating voltage can be an AC voltage with or without an offset.

If a large load is now switched on, this can lead to a dip in the input DC voltage. This can be seen, for example, in FIG. 1. There, the input voltage Vin dips for the period $\Delta t$.

This can then be perceived as flickering or discontinuity of the optical properties since the output AC voltage no longer has the desired amplitude and/or the desired frequency.

To date, the approach for avoiding this has been to buffer the input voltage such that the periods $\Delta t$ of such a dip in input voltage can be bridged.

However, this approach requires large capacitors which, for one thing, require installation space and, for another, are also expensive. In addition, these elements must first be charged for use, such that they also require a high (initial) charging current. This problem is known not only from automotive engineering but also in the case of architectural glazings.

DE 10 2010 056203 A1 discloses a method for operation of transparent surface elements with a variable level of transmittance, wherein a source voltage is converted into a first AC voltage using an analog oscillator circuit of a converter.

CN 2740453 Y appears to disclose a sun shading device with a liquid crystal panel.

WO 2020/152075 A1 discloses a laminated pane arrangement having a functional element based on liquid crystals, wherein the optical properties of the functional element and electrical resistance heating of one flat electrode are controlled by two different AC voltages.

SUMMARY

Starting from this, an object of the invention is to provide methods and an arrangement for carrying out the method that avoids the flicker effect at low cost over a defined period of time.

The object is accomplished by a method for driving an electro-optical functional layer by means of a control unit, wherein the functional layer is applied on a substrate, and wherein the electro-optical functional layer can be varied in its transmissive and/or reflective properties by applying an electric field, wherein the control unit has a supply voltage input and a feed output as well as voltage measuring means and an energy store. The method has a step of measuring a voltage actually available at the supply voltage input. If the available voltage is greater than a reference value, the electro-optical functional layer is driven with an AC voltage via the feed output wherein the energy store is charged at least in sections. If, on the other hand, the available voltage is less than or equal to a reference value, the electro-optical functional layer is driven with a DC voltage via the feed output, with at least part of the energy for the driving drawn from the energy store, with the DC voltage being less than the peak value of the AC voltage.

This advantageously avoids the flicker effect since, now, a DC voltage is applied to the electro-optical functional layer. The time periods during which this occurs are comparatively short such that the service life loss over the entire service life is small. Since, with a DC voltage, the electro-optical layer does not have to be recharged, the energy store can be dimensioned small since it no longer has to buffer over an anticipated period of time $\Delta t$, but only has to store enough energy to achieve the desired DC voltage in the electro-optical functional layer. The electro-optical functional layer then also constitutes an energy store.

In one embodiment of the invention, the reference value is a predetermined value that is smaller by at least half than a specified voltage, e.g., the specified voltage of an onboard electrical system.

In other words, the invention can be adapted to different scenarios of voltage disturbances and voltage sources.

In another embodiment of the invention, the frequency of the AC voltage is preferably 25 Hz or more. In other words, the frequency can be greater than or equal to 25 Hz.

In other words, by choosing a frequency that is higher than the perception capability of the (human) eye, a flicker effect is prevented.

In another embodiment of the invention, the frequency of the AC voltage is preferably 100 Hz or lower, i.e., the frequency can be less than or equal to 100 Hz.

By choosing a low frequency, the energy requirement is reduced since with increasing frequency, recharging becomes more energy consuming. As a result, the method can work efficiently even in the undisturbed case.

In another embodiment of the invention, the step of measuring requires less than a half-period of the AC voltage.

In other words, if within the half-period, it is detected that the input voltage is dropping, the method can immediately change to DC voltage and thus keep the energy store small.

In another embodiment of the invention, the energy store enables, in the charged state, the driving of the electro-optical functional layer for a period of 0.25 seconds or more.

According to one embodiment of the invention, the energy store, in the charged state, enables the driving of the electro-optical functional layer for a period of 1 second or less.

In other words, typical voltage fluctuations can be readily compensated for.

The object is also accomplished by an arrangement for carrying out one of the methods according to the invention. In this case, the arrangement has a substrate, an electro-optical functional layer, and a control unit, wherein the functional layer is applied on the substrate, wherein the electro-optical functional layer can be varied in its transmissive and/or reflective properties by applying an electric field, wherein the control unit has a supply voltage input and a feed output as well as voltage measuring means and an energy store, wherein the voltage measuring means device are set up for measuring a voltage actually available at the supply voltage input, wherein, if the available voltage is greater than a reference value, the control unit is set up for driving the electro-optical functional layer with an AC voltage via the feed output, with the energy store charged at least in sections, wherein, if the available voltage is less than or equal to a reference value, the control unit is set up for driving the electro-optical functional layer with a DC voltage via the feed output, wherein at least part of the energy for the driving is drawn from the energy store, wherein the DC voltage is less than the peak value of the AC voltage.

As a result, the flicker effect is advantageously avoided since a DC voltage is now applied to the electro-optical functional layer. The periods of time during which this occurs are comparatively short, such that the service life loss over the entire service life is small. Since, with a DC voltage, the electro-optical layer does not have to be recharged, the energy store can be dimensioned small since it no longer has to buffer over an anticipated period of time Δt, but only has to store enough energy to achieve the desired DC voltage in the electro-optical functional layer. The electro-optical functional layer then also constitutes an energy store.

In one embodiment of the invention, the reference value is a predetermined value that is smaller by at least half than a specified voltage, e.g., the specified voltage of an onboard electrical system.

In other words, the invention can be adapted to different scenarios of voltage disturbances and voltage sources.

In one embodiment of the invention, the frequency of the AC voltage is preferably 25 Hz or more. The frequency of the AC voltage can be greater than or equal to 25 Hz.

In other words, by choosing a frequency that is higher than the perception capability of the (human) eye, a flicker effect is prevented.

In another embodiment of the invention, the frequency of the AC voltage is preferably 100 Hz or lower. The frequency of the AC voltage can thus be less than or equal to 100 Hz.

By choosing a low-frequency, the energy requirement is reduced since with increasing frequency, recharging becomes more energy consuming. As a result, the method can work efficiently even in the undisturbed case.

In other words, if within the half-period, it is detected that the input voltage is dropping, the method can immediately change to DC voltage and thus keep the energy store small.

In another embodiment of the invention, the energy store enables, in the charged state, the driving of the electro-optical functional layer for a period of 0.25 seconds or more. According to one embodiment of the invention, the energy store, in the charged state, enables the driving of the electro-optical functional layer for a period of 1 second or less. In other words, typical voltage fluctuations can thus be readily compensated for.

In one embodiment of the invention, the electro-optical functional layer is selected from a group comprising polymer dispersed liquid crystal (PDLC), suspended particle devices (SPD), liquid crystal, or electrochromic.

In other words, the invention can be used with all common electro-optical functional layers.

In one embodiment of the invention, the control unit is a control unit for driving an electro-optical functional layer.

In other words, the driving can advantageously be integrated into existing systems. Provided the necessary devices are present, the invention can also be provided as a software update.

According to another embodiment of the invention, the substrate is selected from among a group comprising flat glass, float glass, quartz glass, borosilicate glass, soda lime glass or clear plastics, preferably rigid clear plastics, in particular polyethylene, polypropylene, polycarbonate, polymethyl methacrylate, polystyrene, polyamide, polyester, polyvinyl chloride, and/or mixtures thereof.

Thus, the invention can be used in all areas of vehicle glazing as well as in all areas of architectural glazing.

In particular, the embodiments can also be implemented in a composite pane which has the substrate and the electro-optical functional layer, wherein the substrate is joined to another substrate via an intermediate layer.

BRIEF DESCRIPTION OF THE DRAWINGS

In the following, the invention is explained in detail with reference to drawings and exemplary embodiments. The drawings are schematic representations and are not to scale. The drawings in no way restrict the invention.

They depict.

DETAILED DESCRIPTION

In the following, the invention is presented in more detail with reference to the figures. It should be noted that different aspects are described, each of which can be used individually or in combination. In other words, any aspects can be used with different embodiments of the invention unless explicitly presented as a pure alternative.

Insofar as methods are described in the following, the individual steps of a method can be arranged in any order and/or combined, provided the context does not explicitly indicate otherwise. Furthermore, the methods can be combined with each other—unless expressly indicated otherwise.

Statements with numerical values are generally to be understood not as exact values, but also include a tolerance of +/−1% up to +/−10%.

Insofar as standards, specifications, or the like are mentioned in this application, at least the standards, specifications, or the like applicable on the filing date are always referred to. In other words, if a standard/specification, etc. is updated or replaced by a successor, the invention is also applicable thereto.

Various embodiments are depicted in the figures.

Figure 4:
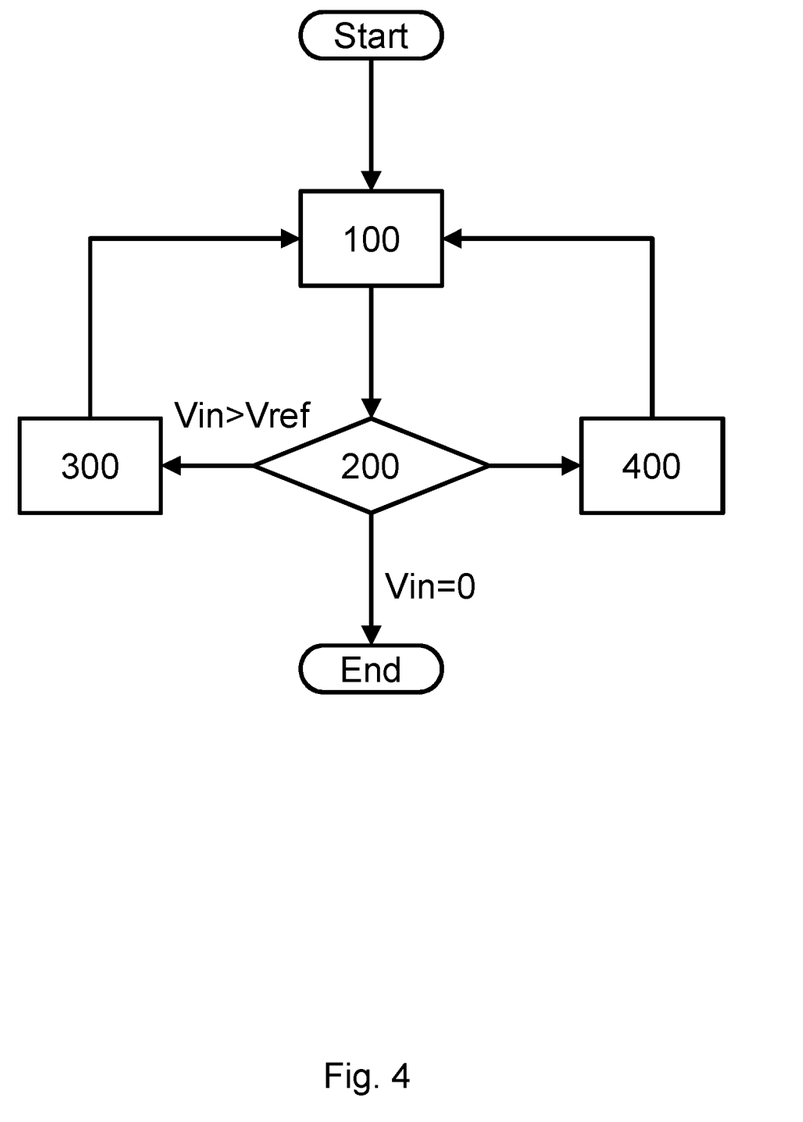

In the following, a method according to the invention for driving an electro-optical functional layer FS1 by means of a control unit ECU (so-called "electronic control unit") will be shown with reference to FIG. 4.

Figure 3:
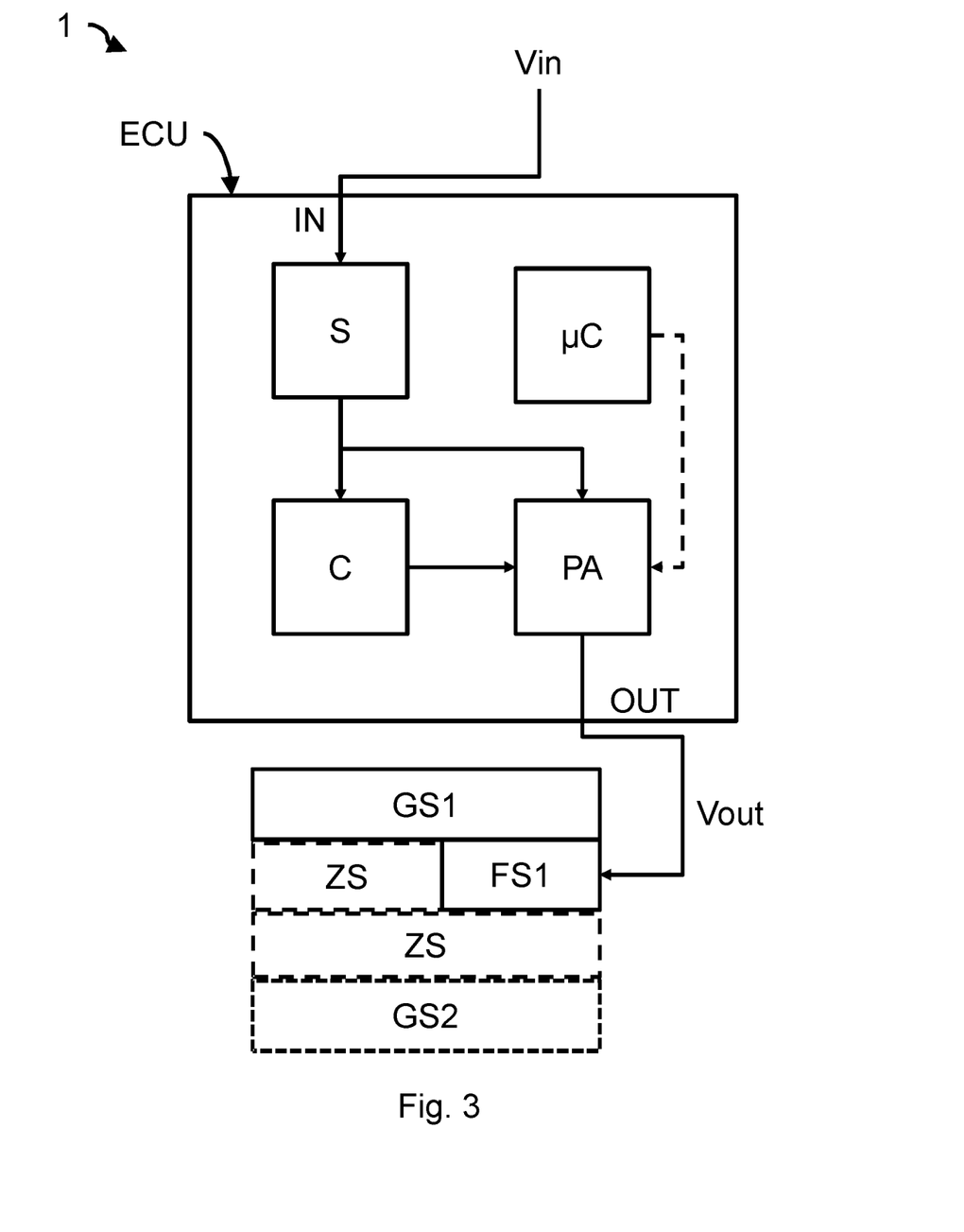

In the method according to the invention or the arrangement according to the invention of FIG. 3, the functional layer FS1 is applied on a substrate GS1. By applying an electric field to the electro-optical functional layer FS1, the electro-optical functional layer FS1 can be varied in its transmissive and/or reflective properties. The control unit ECU has at least one supply voltage input IN and one feed output OUT, as well as voltage measuring means S and an energy store C.

The method according to the invention has a step of measuring 100 a voltage Vin actually available at the supply voltage input IN. The voltage available at the supply voltage input IN can, for example, be a DC voltage or an AC voltage. Typical voltages are 12 V DC voltage or 24 V DC voltage or 48 V DC, as are found in on board electrical systems of vehicles.

In a step 200, the method according to the invention now compares the available voltage Vin with a reference value Vref. The reference value can, for example, be dependent on a preselected target value of the output voltage, in order, for example, to provide a predetermined transmittance and/or reflection. In other words, the reference value can vary.

If, in step 200, the available voltage Vin is greater than a reference value Vref, the electro-optical functional layer FS1 can be driven with an AC voltage VAC via the feed output OUT in step 300, wherein the energy store C is charged at least in sections. In other words, during the period of normal operation, the small energy store C is kept substantially charged such that sufficient energy is available in the event of a fault.

However, if, in step 200, the available voltage Vin is less than or equal to a reference value Vref, the electro-optical functional layer FS1 can be driven with a DC voltage VDC via the feed output OUT in step 400, wherein, now, at least part of the energy or even all of the energy for the driving is drawn from the energy store C. In other words, during the period of the fault, —depending on the charge state of the electro-optical functional layer FS1—energy is still required to charge the electro-optical functional layer FS1 to a target value in DC voltage operation.

The DC voltage VDC is less than the peak value of the AC voltage VAC. As a rule, the value of the DC voltage is between 50% and 80% of the peak value of the AC voltage VAC, in particular 65% to 75% of the peak value of the AC voltage VAC. The value can be determined empirically and stored, for example, as a simple calculation rule or as a look-up table in the control unit.

The invention also provides an arrangement for carrying out one of the methods according to the invention. The arrangement has—as shown in FIG. 3—a substrate GS1, an electro-optical functional layer FS1, a control unit ECU. The functional layer FS1 is applied on the substrate GS1. The electro-optical functional layer FS1 can be varied in its transmissive and/or reflective properties by applying an electric field or a voltage. In other words, the functional layer FS1 is variable in its transmissive and/or reflective properties by applying an electric field or a voltage. The control unit ECU has a supply voltage input IN and a feed output OUT as well as voltage measuring means S and an energy store C, wherein the voltage measuring means S are set up for measuring 100 a voltage Vin actually available at the supply voltage input IN. If, in step 200, the available voltage Vin is greater than a reference value Vref, the control unit ECU is set up for driving 300 the electro-optical functional layer FS1 with an AC voltage VAC via the feed output OUT, with the energy store C being charged at least in sections. If, in step 200, the available voltage Vin is less than or equal to a reference value Vref, the control unit ECU is set up for driving 400 the electro-optical functional layer FS1 with a DC voltage VDC via the feed output OUT, with at least part of the energy for the driving drawn from the energy store C, the DC voltage VDC being less than the peak value of the AC voltage VAC.

As a result, the flicker effect is advantageously avoided since, now, a DC voltage is applied to the electro-optical functional layer. The periods of time during which this occurs are comparatively short such that the service life loss over the entire service life is small. Since, with a DC voltage, the electro-optical layer does not have to be recharged, the energy store can be dimensioned small since it no longer has to buffer over an anticipated period of time $\Delta t$, but only has to store enough energy to achieve the desired DC voltage in the electro-optical functional layer. The electro-optical functional layer then also constitutes an energy store.

Here, the invention makes use of the fact that an electro-optical functional layer FS1 acts predominantly like a capacitor such that the capacitor only needs to be charged. In the theoretical case of an ideal capacitor, when a DC voltage is applied, the voltage would asymptotically tend toward the DC voltage applied and the current would continue to decrease. In practice, the current quickly drops to negligible values.

Figure 1:
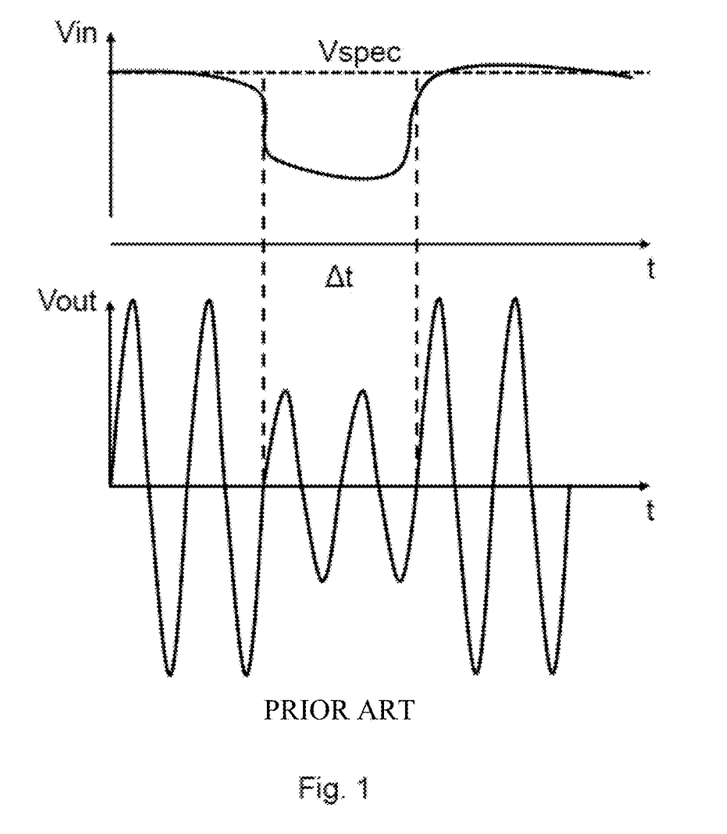
FIG. 1 a schematic comparison of an input voltage and a possible output voltage curve according to the prior art, FIG. 2 a schematic comparison of an input voltage and a possible output voltage curve according to embodiments of the invention, FIG. 3 a schematic representation of units according to embodiments of the invention, and FIG. 4 an exemplary flow chart according to embodiments of the invention.
Figure 2:
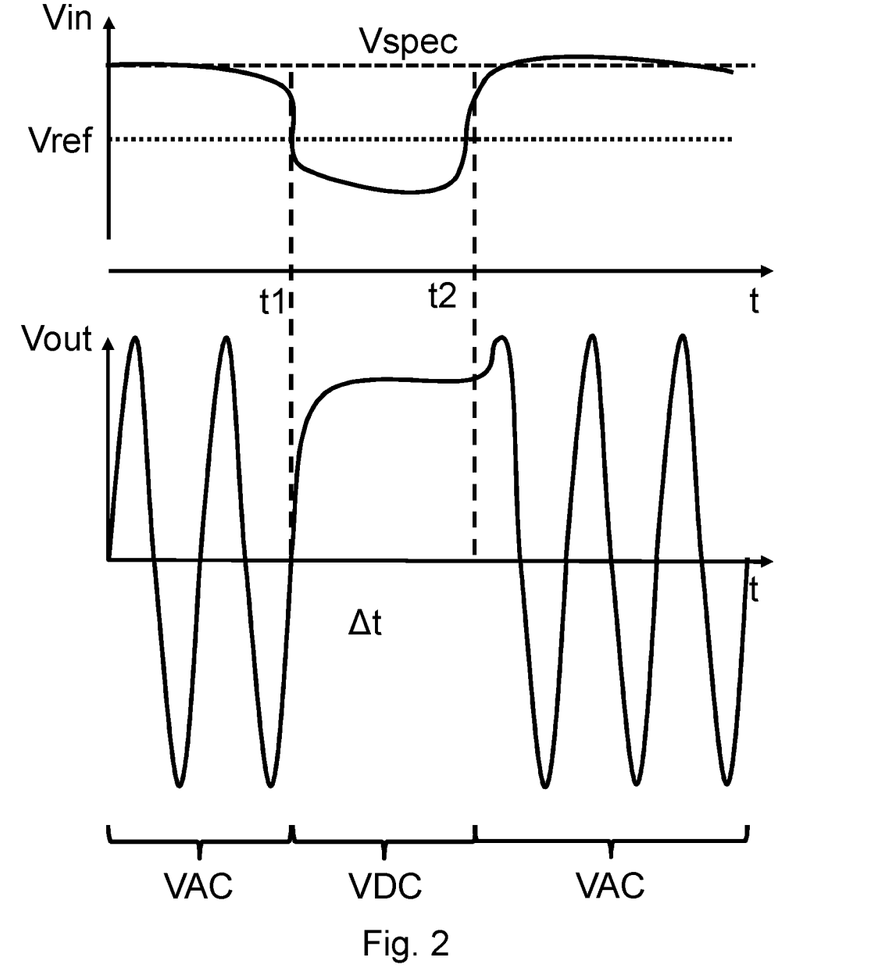

Accordingly, the behavior now differs from FIG. 1 as shown in FIG. 2. After the electro-optical functional layer FS1 is supplied (according to step 300) in a phase of normal operation with an AC voltage VAC via the feed output OUT, it is detected at a point in time t1 in a step 200 that the input voltage Vin falls below the reference value Vref. Now, the electro-optical functional layer FS1 is supplied (according to step 400) with a DC voltage VDC via the feed output OUT. If, at a later point in time t2, the return of the input voltage Vin above the reference value Vref is detected (again in step 200), the electro-optical functional layer FS1 will again be supplied with an AC voltage VAC via the feed output OUT (according to step 300). In the case that there is no longer any voltage at all, i.e., the input voltage Vin=0 volts, the method can optionally end.

In one embodiment of the invention, the reference value Vref at which the switchover from AC voltage operation to DC voltage operation occurs is less at least by half than the specified voltage Vspec. I.e., if the specified voltage Vspec is, for example, 12 V, the reference value Vref is, for example, 6 V or less, e.g., 5 V. This reference value Vref can, for example, be dependent on a current target value of the AC voltage.

In other words, the invention can be adapted to different scenarios of voltage disturbances and voltage sources.

In another embodiment of the invention, the frequency of the AC voltage is preferably 25 Hz or more.

In other words, by choosing a frequency that is higher than the perception capability of the (human) eye, a flicker effect is prevented.

In another embodiment of the invention, the frequency of the AC voltage is preferably 100 Hz or lower.

By choosing a low frequency, the energy requirement is reduced since with increasing frequency, recharging of the electro-optical functional layer FS1 becomes more energy consuming. As a result, the method can work efficiently even in the undisturbed case.

In another embodiment of the invention, the step of measuring 100 requires less than a half-period of the AC voltage.

In other words, if within the half-period, it is detected that the input voltage Vin is dropping, the method can immediately change to DC voltage VDC and thus keep the energy store small.

In another embodiment of the invention, the energy store C enables, in the charged state, the driving of the electro-optical functional layer FS1 for a period of 0.25 seconds or more.

According to one embodiment of the invention, the energy store C, in the charged state, enables the driving of the electro-optical functional layer FS1 for a period of 1 second or less.

In other words, typical voltage fluctuations such as those that can occur when power-hungry loads are switched on can be readily compensated for.

In one embodiment of the invention, the electro-optical functional layer FS1 is selected from a group comprising polymer dispersed liquid crystal (PDLC), suspended particle devices (SPD), liquid crystal, or electrochromic.

In other words, the invention can be used with all common electro-optical functional layers.

In one embodiment of the invention, the control unit ECU is a control unit for driving an electro-optical functional layer. The control unit ECU has, for example, (internal) voltage measuring means S and a microcontroller µC. The energy store C can—as shown—be implemented internally in the control unit ECU and/or externally on the control unit. The microcontroller µC can execute the methods according to the invention. These can be stored in a static or variable memory and executed on the microcontroller µC. For this purpose, the microcontroller µC can, for example, receive or query data from the voltage measuring means S. Under the influence of the microcontroller µC a driver stage PA can be driven in order to provide a DC voltage VDC or an AC voltage VAC to the feed output OUT.

According to another embodiment of the invention, the substrate GS1 is selected from a group comprising flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof.

Thus, the invention can be used in all areas of vehicle glazing as well as in all areas of architectural glazing.

In particular, the embodiments can also be implemented in a composite pane that has the substrate GS1 and the electro-optical functional layer FS1, wherein the substrate GS1 is joined via at least one intermediate layer ZS to another substrate GS2. An intermediate layer can comprise at least one material selected from the group comprising polyimide, polyurethane, polymethylene methacrylic acid, polycarbonate, polyethylene terephthalate, polyvinyl butyral, FR6, acrylonitrile butadiene styrene copolymer, polyethylene, polypropylene, polyvinyl chloride, polystyrene, polybutylene terephthalate, polyamide. Likewise, an intermediate layer (not shown) can be arranged between the substrate GS1 and the electro-optical functional layer FS1.

The invention therefore makes it possible, in particular even under conditions of a temporary voltage dip, to provide flicker-free operation wherein, unlike in the prior art, large buffers can now be dispensed with.

LIST OF REFERENCE CHARACTERS 1 arrangement
HC microcontroller
Vin input voltage
Vout output voltage
GS1 substrate
GS2 substrate
ZS intermediate layer
FS1 electro-optical functional layer
ECU control unit
IN supply voltage input
OUT feed output
S voltage measuring means
C energy store
Vin available voltage
PA driver stage
Steps of the method
  100 Measuring a voltage (Vin) actually available at the supply voltage input (IN),
  200 Comparing the available voltage (Vin) with a reference value (Vref)
  300 Driving the electro-optical functional layer (FS1) with an AC voltage (VAC) via the feed output (OUT), with the energy store (C) being charged at least in sections,
  400 Driving the electro-optical functional layer (FS1) with a DC voltage (VDC) via the feed output (OUT), with at least part of the energy for the driving being drawn from the energy store (C).

The invention claimed is:

1. A method for driving an electro-optical functional layer by a control unit, wherein the electro-optical functional layer is applied on a substrate, and wherein the electro-optical functional layer is variable in its transmissive and/or reflective properties by applying an electric field, wherein the control unit has a supply voltage input and a feed output as well as voltage measuring device and an energy store, the method comprising:
  measuring a voltage actually available at the supply voltage input,
  if the available voltage is greater than a reference value, driving the electro-optical functional layer with an AC voltage via the feed output, wherein the energy store is charged at least in sections,
  if the available voltage is less than or equal to a reference value, driving the electro-optical functional layer with a DC voltage via the feed output, wherein at least part of the energy for the driving is drawn from the energy store,
  wherein the DC voltage is less than the peak value of the AC voltage.

2. The method according to claim 1, wherein the reference value is smaller by at least half than a specified voltage.

3. The method according to claim 1, wherein a frequency of the AC voltage is greater than or equal to 25 Hz.

4. The method according to claim 1, wherein a frequency of the AC voltage is less than or equal to 100 Hz.

5. The method according to claim 1, wherein the measuring requires less than a half-period of the AC voltage.

6. The method according to claim 1, wherein in a charged state, the energy store enables driving the electro-optical functional layer for a period of 0.25 seconds or more.

7. The method according to claim 1, wherein in a charged state, the energy store enables driving the electro-optical functional layer for a period of 1 second or less.

8. An arrangement for carrying the method according to claim 1, the arrangement comprising:
a substrate,
an electro-optical functional layer,
a control unit,
wherein the electro-optical functional layer is applied on the substrate, and wherein the electro-optical functional layer is variable in its transmissive and/or reflective properties by applying an electric field,
wherein the control unit has a supply voltage input and a feed output as well as voltage measuring device and an energy store,
wherein the voltage measuring device are set up for measuring a voltage actually available at the supply voltage input,
wherein, if the available voltage is greater than a reference value, the control unit is set up for driving the electro-optical functional layer with an AC voltage via the feed output, wherein the energy store is charged at least in sections,
wherein, if the available voltage is less than or equal to a reference value, the control unit is set up for driving the electro-optical functional layer with a DC voltage via the feed output, wherein at least part of the energy for the driving is drawn from the energy store,
wherein the DC voltage is less than the peak value of the AC voltage.

9. The arrangement according to claim 8, wherein the reference value is smaller by at least half than a specified voltage.

10. The arrangement according to claim 8, wherein a frequency of the AC voltage is greater than or equal to 25 Hz.

11. The arrangement according to claim 8, wherein a frequency of the AC voltage is less than or equal to 100 Hz.

12. The arrangement according to claim 8, wherein the voltage measuring device require less than a half-period of the AC voltage for the measuring.

13. The arrangement according to claim 8, wherein in a charged state, the energy store enables the driving of the electro-optical functional layer for a period of 0.25 seconds or more.

14. The arrangement according to claim 8, wherein in a charged state, the energy store enables the driving of the electro-optical functional layer for a period of 1 second or less.

* * * * *